(12) United States Patent
Jablonski

(10) Patent No.: US 10,380,162 B2
(45) Date of Patent: Aug. 13, 2019

(54) ITEM TO VECTOR BASED CATEGORIZATION

(71) Applicant: Accenture Global Solutions Limited, Dublin (IE)

(72) Inventor: John Jablonski, King of Prussia, PA (US)

(73) Assignee: Accenture Global Solutions Limited, Dublin (IE)

( * ) Notice: Subject to any disclaimer, the term of this patent is extended or adjusted under 35 U.S.C. 154(b) by 415 days.

(21) Appl. No.: 15/334,808

(22) Filed: Oct. 26, 2016

(65) Prior Publication Data

US 2018/0113934 A1 Apr. 26, 2018

(51) Int. Cl.
| | | |
|---|---|---|
| *G06F 17/00* | (2019.01) | |
| *G06F 16/35* | (2019.01) | |
| *G06N 20/00* | (2019.01) | |
| *G06F 16/33* | (2019.01) | |
| *G06F 17/27* | (2006.01) | |

(52) U.S. Cl.
CPC ............ *G06F 16/35* (2019.01); *G06F 16/334* (2019.01); *G06F 17/2705* (2013.01); *G06N 20/00* (2019.01)

(58) Field of Classification Search
CPC .... G06F 16/353; G06F 3/0237; G06F 16/285; G06F 17/276; G06F 3/04886; G06F 16/35
USPC .......................................................... 707/704
See application file for complete search history.

(56) References Cited

U.S. PATENT DOCUMENTS

| | | |
|---|---|---|
| 6,253,169 B1 | 6/2001 | Apte et al. |
| 7,447,665 B2 | 11/2008 | Murray |
| 7,870,039 B1 | 1/2011 | Dom et al. |
| 2002/0156793 A1 | 10/2002 | Jaro |
| 2005/0125368 A1 | 6/2005 | Akahori |
| 2015/0154192 A1* | 6/2015 | Lysne ............... G06F 16/24578 707/748 |
| 2016/0292592 A1 | 10/2016 | Patthak et al. |

FOREIGN PATENT DOCUMENTS

EP 0649105 A1 10/1993

OTHER PUBLICATIONS

Wikipedia, "Word2vec," https://en.wikipedia.org/wiki/Word2vec, Oct. 25, 2016, 5 pages.

(Continued)

*Primary Examiner* — Truong V Vo
(74) *Attorney, Agent, or Firm* — Harrity & Harrity, LLP

(57) ABSTRACT

A device may receive information that identifies an item to be categorized. The device may map the item to a first vector based on the information that identifies the item. The device may compare the first vector to a second vector based on mapping the item to the first vector. The device may determine a similarity value between the first vector and the second vector based on comparing the first vector and the second vector. The device may determine that the similarity value satisfies a threshold. The device may determine a category associated with the item based on the similarity value satisfying the threshold. The second vector may be associated with the category. The device may provide information that identifies the category associated with the item to cause an action to be performed.

20 Claims, 11 Drawing Sheets

(56) References Cited

OTHER PUBLICATIONS

Barkan et al., "Item2Vec: Neural Item Embedding for Collaborative Filtering," https://arxiv.org/ftp/arxiv/papers/1603/1603.04259.pdf, Mar. 14, 2016, 8 pages.
Australian Search Report No. 1 corresponding to AU 2017239523 dated Mar. 7, 2018, 7 pages.

* cited by examiner

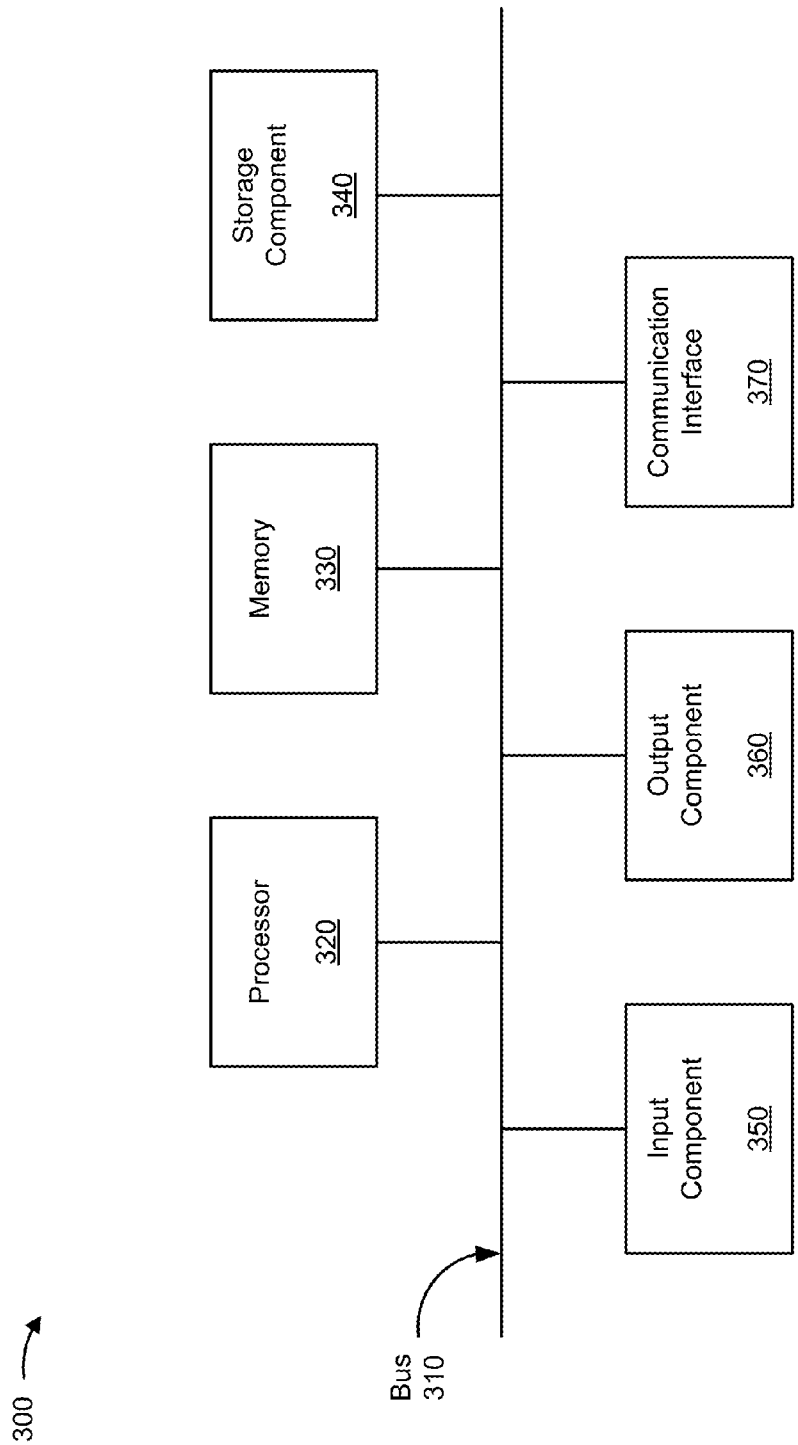

ITEM TO VECTOR BASED CATEGORIZATION

BACKGROUND

Word embedding may include a language modeling and/or feature learning technique in natural language processing (NLP) where words or phrases are mapped to vectors of real numbers in a dimensional metric space.

SUMMARY

In some possible implementations, a device may include one or more processors. The one or more processors may receive information that identifies an item to be categorized. The item may include a set of first terms. The one or more processors may map the item to a first vector based on the set of first terms. The first vector may include a set of first values that correspond to the set of first terms. The one or more processors may compare the first vector and a second vector associated with a categorized item. The second vector may include a set of second values that correspond to a set of second terms associated with the categorized item. The one or more processors may determine an amount of the first values that match the second values based on comparing the first vector and the second vector. The one or more processors may determine a similarity value between the first vector and the second vector based on the amount of the first values that match the second values. The one or more processors may determine that the similarity value satisfies a threshold. The one or more processors may determine a category associated with the item based on the similarity value satisfying the threshold. The categorized item may be associated with the category. The one or more processors may provide information that identifies the category associated with the item to permit and/or cause an action to be performed.

In some possible implementations, a method may include receiving, by a device, information that identifies a first item to be categorized. The method may include mapping, by the device, the first item to a first vector. The first vector may include one or more values that correspond to one or more terms of the first item. The method may include comparing, by the device, the first vector and a second vector. The second vector may be associated with a second item. The method may include determining, by the device, a similarity value associated with the first vector and the second vector based on comparing the first vector and the second vector. The method may include determining, by the device, that the similarity value satisfies a threshold. The method may include determining, by the device, a category associated with the first item based on the similarity value satisfying the threshold. The second item may be associated with the category. The method may include providing, by the device, information that identifies the category associated with the first item to permit an action to be performed.

In some possible implementations, a non-transitory computer readable medium may store instructions. The instructions may cause a processor to receive information that identifies an item to be categorized. The instructions may cause the processor to map the item to a first vector based on the information that identifies the item. The instructions may cause the processor to compare the first vector to a second vector based on mapping the item to the first vector. The instructions may cause the processor to determine a similarity value between the first vector and the second vector based on comparing the first vector and the second vector. The instructions may cause the processor to determine that the similarity value satisfies a threshold. The instructions may cause the processor to determine a category associated with the item based on the similarity value satisfying the threshold. The second vector may be associated with the category. The instructions may cause the processor to provide information that identifies the category associated with the item to cause an action to be performed.

BRIEF DESCRIPTION OF THE DRAWINGS

FIG. 3 is a diagram of example components of one or more devices of FIG. 2; and

DETAILED DESCRIPTION

Figure 1A:
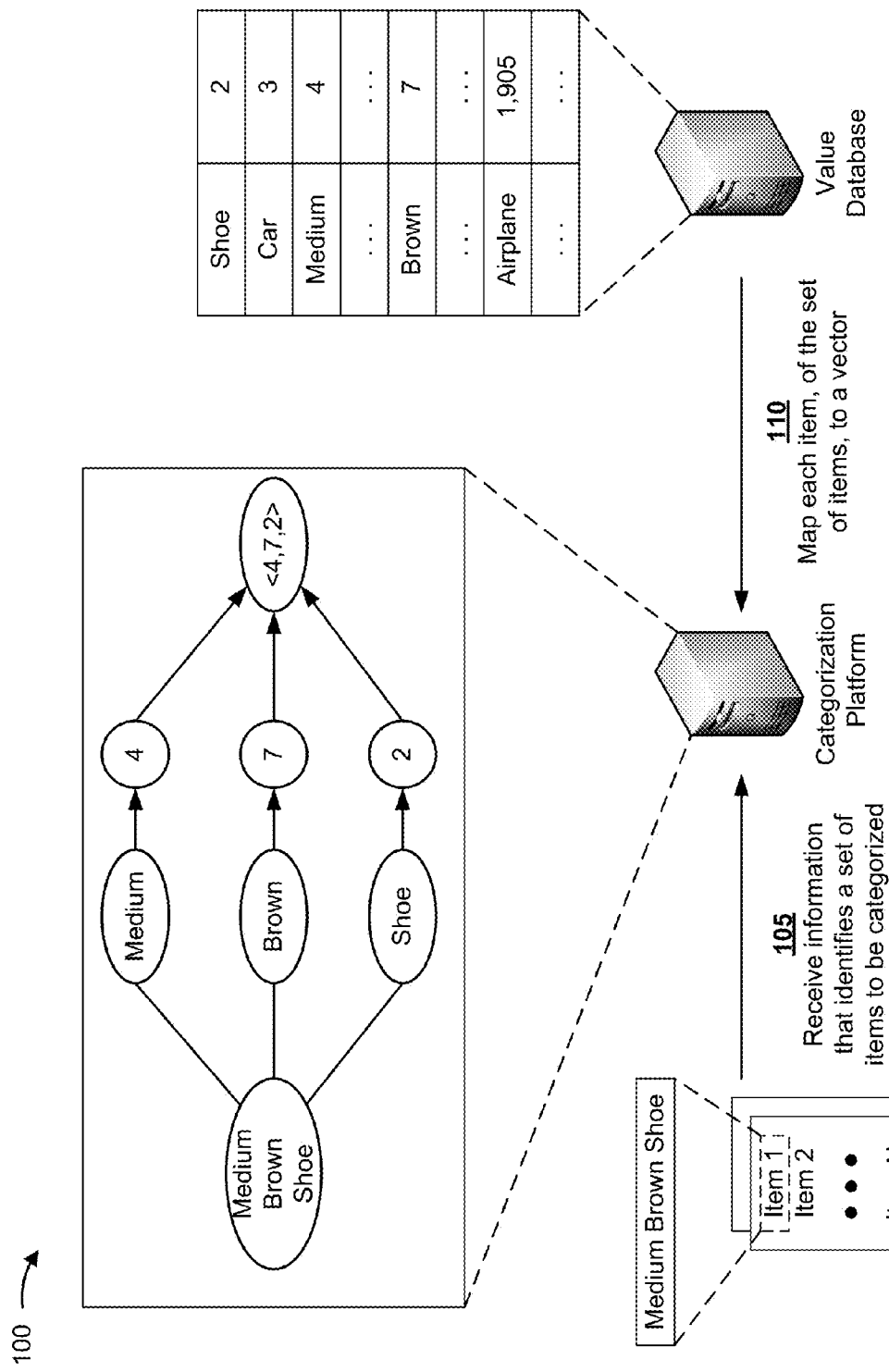
FIGS. 1A-1G are diagrams of an overview of an example implementation described herein.

The following detailed description of example implementations refers to the accompanying drawings. The same reference numbers in different drawings may identify the same or similar elements.

Items may be categorized to identify relationships between particular items. As an example, in the procurement industry, an entity (e.g., a company, a business, an organization, or the like) may conduct a spend analysis to classify and analyze expenditure data to decrease procurement costs, increase efficiency, etc. In some cases, the success of the spend analysis may rely on the granularity, rate, and/or accuracy at which an entity may categorize its spend. As a further example, an entity may procure, from a particular supplier, goods that encompass multiple disparate categories. Additionally, the entity may attempt to categorize areas of spend to determine particular spend associated with particular categories. For example, an entity may attempt to identify particular areas of spend associated with a particular supplier that may be reduced if spend is allocated towards another supplier (e.g., goods are procured from the other supplier).

Implementations described herein enable a categorization platform to receive information that identifies a set of items to be categorized, map each item, of the set of items, to a vector, and compare vectors, of the set of items, to vectors of categorized items. Additionally, implementations described herein enable the categorization platform to determine a similarity value (e.g., a hamming distance value or a value generated using another technique used to quantify the similarity between two vectors) between an item and a categorized item based on respective vectors. In this way, the categorization platform may determine matches between items and categorized items, and may categorize the items based on the matches. Additionally, implementations described herein enable the categorization platform to compare vectors associated with matched items, of the set of items, and vectors of unmatched items of the set of items. In this way, implementations described herein enable the categorization platform to reduce an amount of time associated with categorization, increase an accuracy of categorization (e.g., by identifying similarities between data points within a dataset), and increase efficiency of categorization (e.g., by categorizing multiple items simultaneously). In this way, implementations described herein may conserve processor and/or memory resources of the categorization platform and/or databases associated with categorization.

While some implementations described herein describe item categorization in association with a spend analysis, implementations described herein are applicable to other types of item categorizations, such as item categorizations for product suggestions, for content suggestions, or the like. Additionally, implementations described herein are applicable to other techniques that identify a relationship between items.

FIGS. 1A-1G are diagrams of an overview of an example implementation 100 described herein. As shown in FIG. 1A, and by reference number 105, a categorization platform (e.g., a cloud server) may receive (e.g., from a user device, such as a computing device) information that identifies a set of items to be categorized. For example, the categorization platform may include a resource (e.g., a file including text) that includes multiple items to be categorized. As an example, assume that the resource includes an invoice that contains a list of products (e.g., items), quantities, prices, etc. associated with a supplier. In practice, the resource might include a number of invoices in one or more formats. Additionally, assume that an entity (e.g., that procured the products from the supplier) desires to categorize spend associated with the supplier.

As further shown in FIG. 1A, and by reference number 110, the categorization platform may map each item, of the set of items, to a vector. For example, a vector may include a set of values that correspond to a set of terms associated with an item. In some implementations, the categorization platform may receive, from a value database (e.g., a server device), information that maps particular terms to particular values (e.g., integer values, alphanumeric values, or the like). Additionally, or alternatively, the categorization platform may assign a value to each term of an item, and may map the item to a vector based on assigning the values to the terms. As an example, for a particular item (e.g., "Item 1," which is "Medium Brown Shoe"), the categorization platform may identify a first value for a first term (e.g., "4" for "Medium"), a second value for a second term (e.g., "7" for "Brown"), and a third value for a third term (e.g., "2" for "Shoe"). Additionally, the categorization platform may map the item to a vector (e.g., "<4, 7, 2>") based on the values. Additionally, the categorization platform may map other items, of the set of items (e.g., a thousand items, a million items, etc.), to respective vectors in a similar manner. In some implementations, the categorization platform may use one or more big data techniques to efficiently process the set of items.

Figure 1B:
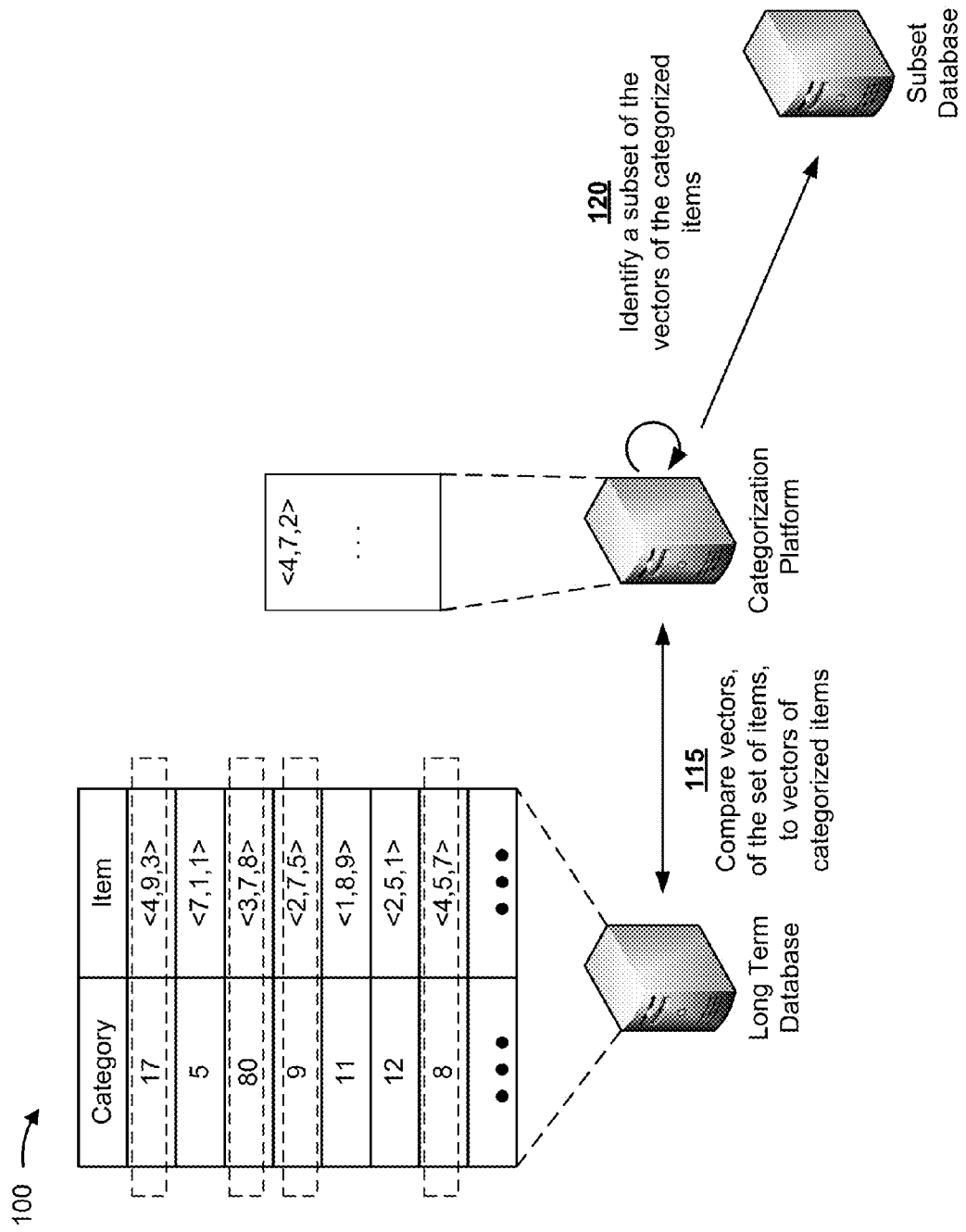

As shown in FIG. 1B, and by reference number 115, the categorization platform may compare vectors, of the set of items, to vectors of categorized items. For example, as shown, a long term database (e.g., a server device) may store information that identifies categories and items (e.g., vectors associated with items) associated with the categories. As an example, multiple items may be associated with a particular category (e.g., shoes, hats, shirts, etc. may be associated with a clothing category). In some implementations, the categorization platform may compare a particular value, associated with a particular element of a vector of an item to be categorized, and a value of a categorized item.

Additionally, or alternatively, as shown by reference number 120, the categorization platform may identify a subset of the vectors of the categorized items. For example, as shown, the categorization platform may identify a subset of vectors of the categorized items that include at least one value that matches a value of an item to be categorized. That is, the vector of the item to be categorized (e.g., "<4, 7, 2>") matches a first categorized item (e.g., "<4, 9, 3>") in relation to a first element of the vector, matches a second categorized item (e.g., "<3, 7, 8>") in relation to a second element of the vector, etc. In other words, the categorization platform may perform a first comparison to determine a subset of vectors of categorized items that match at least a threshold amount of values of a vector of an item to be categorized. As shown in FIG. 1B, the categorization platform may provide, to a subset database (e.g., a server device) information that identifies the subset of the vectors of the categorized items (e.g., to perform a second comparison, as described elsewhere below). In this way, the categorization platform may identify the subset of the vectors (e.g., that are more likely to match a vector of an item to be categorized than as compared to vectors of categorized items that are not included in the subset) and may perform a second comparison regarding the subset of the vectors, thereby increasing the accuracy of categorization, reducing an amount of processing associated with categorization, reducing an amount of time associated with categorization, etc. In this way, the categorization platform may conserve processor and/or memory resources.

Figure 1C:
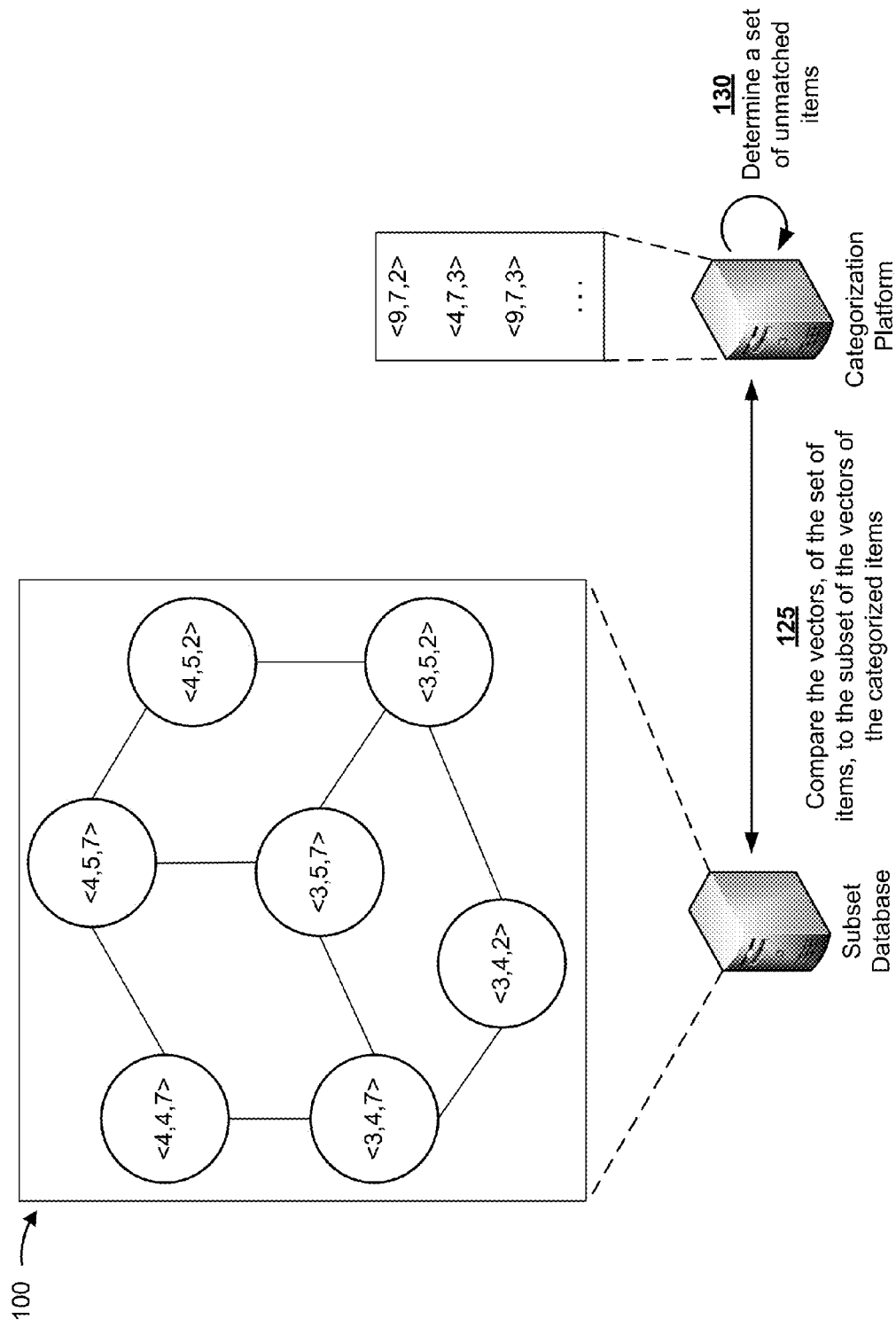

As shown in FIG. 1C, and by reference number 125, the categorization platform may compare the vectors, of the set of items, to the subset of the vectors of the categorized items (e.g., may perform the second comparison). For example, the categorization platform may determine a similarity value between a vector of an item to be categorized and a vector of a categorized item. In some implementations, the similarity value may include a hamming distance value. For example, a hamming distance value may identify an amount (e.g., a minimum number, or the like) of substitutions and/or transformations to change one string into another string (e.g., a first vector into a second vector, or the like). As an example, the categorization platform may compare a vector of an item to be categorized (e.g., "<9, 7, 2>") to a vector of a categorized item (e.g., "<4, 5, 2>"), and determine a hamming distance value of two. That is, the vectors include different values in relation to two elements of the vectors. In other words, the vectors include a single value that matches between the vectors, and would require two substitutions to match. As shown by reference number 130, the categorization platform may determine a set of unmatched items based on comparing the vectors, of the set of items, and the subset of the vectors of the categorized items. For example, an unmatched item may include an item, of the items to be categorized, that includes a similarity value that does not satisfy a threshold (e.g., in relation to a categorized item). Additionally, an unmatched item may include a set of similarity values (e.g., in relation to categorized items, respectively), where each similarity value, of the set of similarity values, does not satisfy the threshold. In other words, an unmatched item does not match a categorized item, each categorized item, etc.

Figure 1D:
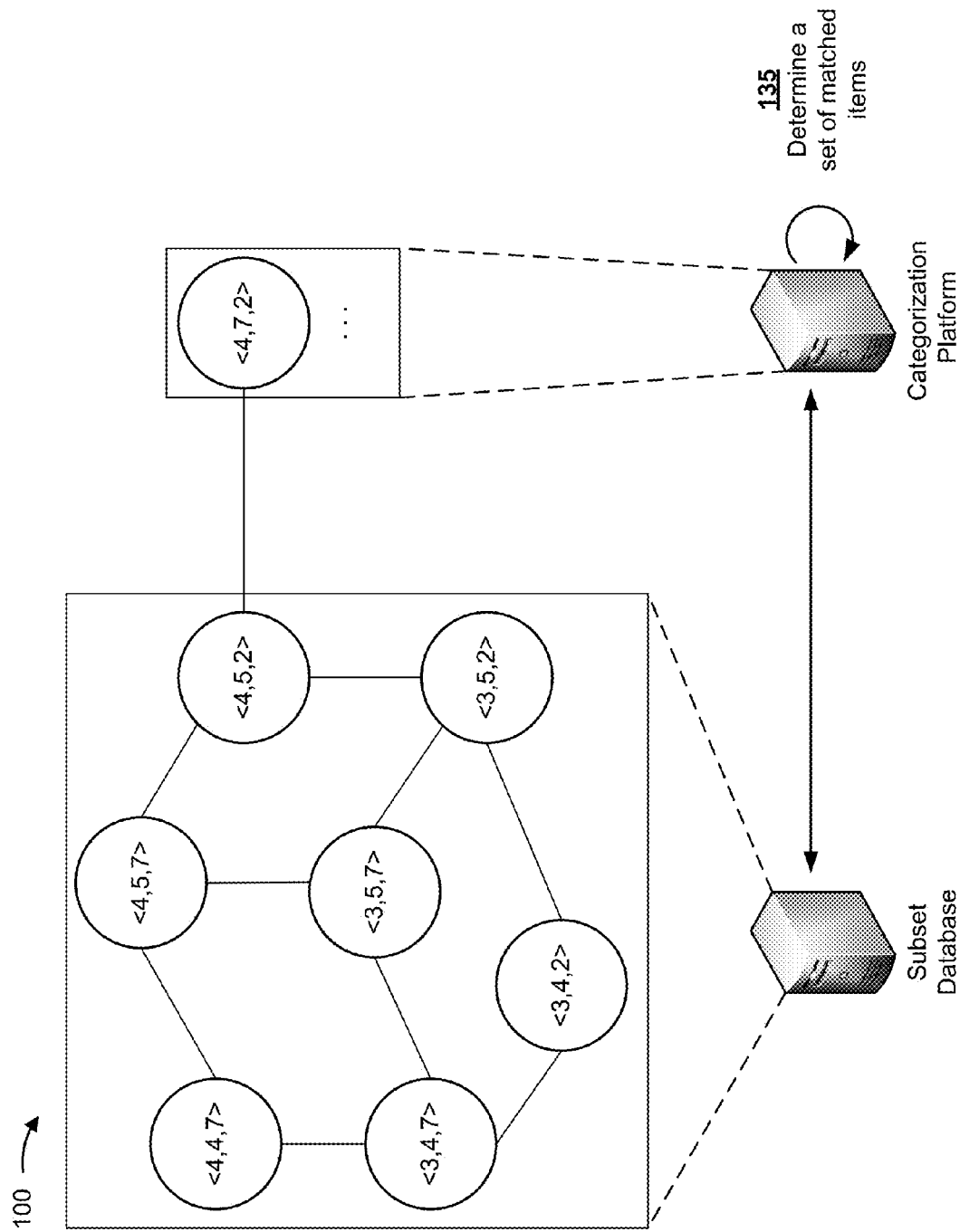

As shown in FIG. 1D, and by reference number 135, the categorization platform may determine a set of matched items based on comparing the vectors, of the set of items, and the subset of the vectors of the categorized items. For example, a matched item may include an item, of the items to be categorized, that includes a similarity value that satisfies a threshold (e.g., in relation to a categorized item). For example, as shown, the categorization platform may compare a vector of an item to be categorized (e.g., "<4, 7, 2>") to a vector of a categorized item (e.g., "<4, 5, 2>"), and determine a hamming distance value of one. Additionally, the categorization platform may determine a matched item (e.g., "<4, 7, 2>") based on the similarity value satisfying the threshold.

Figure 1E:
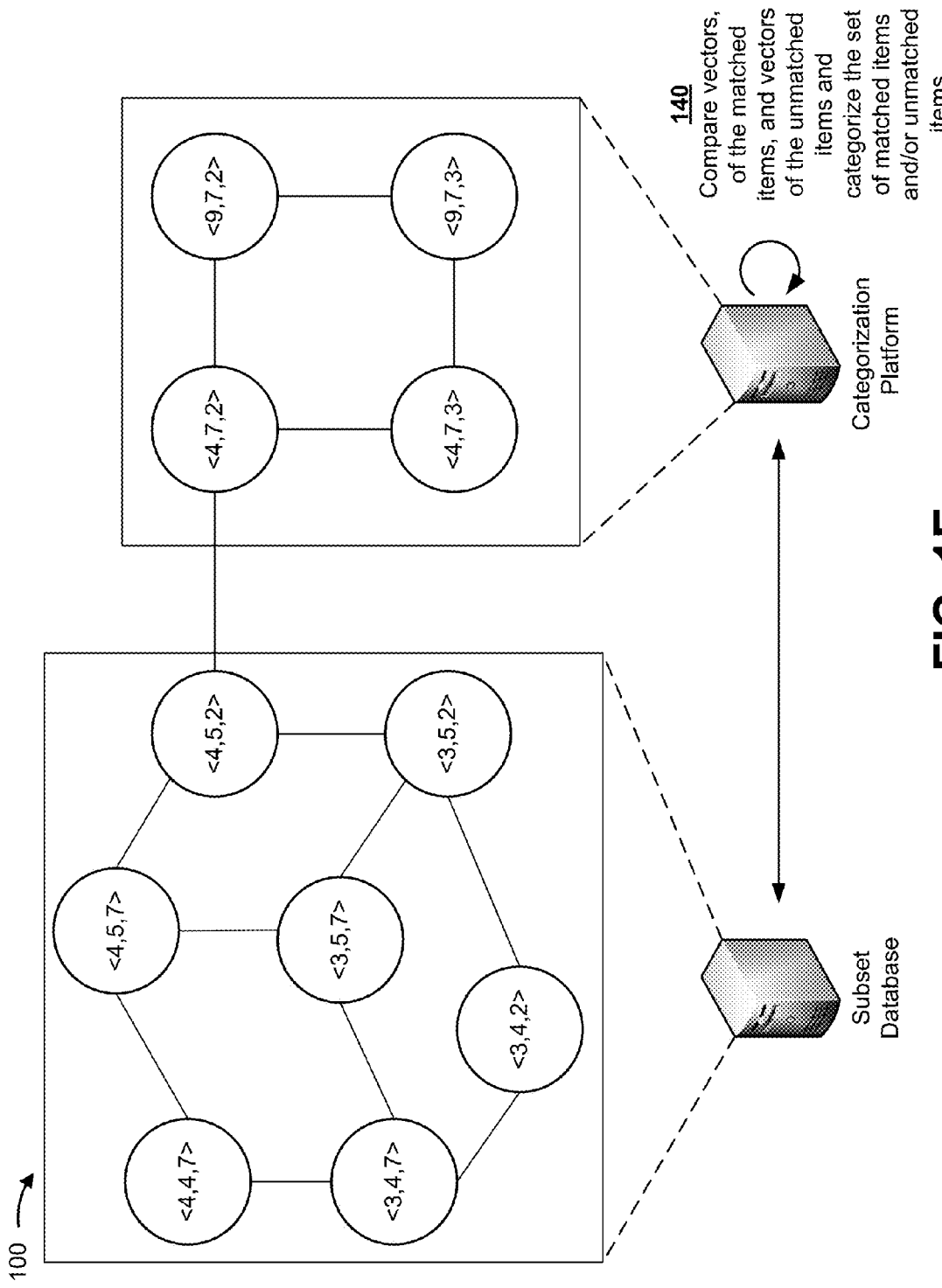

As shown in FIG. 1E, and by reference number 140, the categorization platform may compare vectors, of the matched items, and vectors of the unmatched items and categorize the set of matched items and/or the unmatched items. For example, the categorization platform may compare a vector of a matched item (e.g., "<4, 7, 2>") and vectors of the unmatched items (e.g., "<9, 7, 2>" and "<4, 7, 3>," respectively), and determine that similarity values satisfy a threshold (e.g., the hamming distance values are one, respectively). Additionally, the categorization platform may compare vectors of the unmatched items, and determine a match between a first unmatched item and a second unmatched item. For example, a first unmatched item (e.g., "<9, 7, 3>") may match a second unmatched item (e.g., "<4, 7, 3>") and a third unmatched item (e.g., "<9, 7, 2>"), respectively (e.g., based on respective hamming distance values satisfying a threshold).

In some implementations, the categorization platform may categorize the set of matched items and/or unmatched items. For example, the categorization platform may categorize the matched item (e.g., "<4, 7, 2>") based on a category associated with the categorized item (e.g., "<4, 5, 2>") that includes other categorized items (e.g., "<4, 5, 7>," "<4, 4, 7>," "<3, 5, 7>," etc.). Additionally, the categorization platform may categorize the unmatched items (e.g., "<9, 7, 2>" and "<4, 7, 3>") based on hamming distance values between the unmatched items and the matched item. Additionally, the categorized platform may categorize another unmatched item (e.g., "<9, 7, 3>") based on hamming distance values between the unmatched item and the other unmatched items.

In this way, the categorization platform may categorize items based on intra-dataset comparisons (e.g., between the set of items to be categorized) and/or based on inter-dataset comparisons (e.g., between the set of items to be categorized and categorized items). Additionally, in this way, the categorization platform may categorize multiple items simultaneously. In this way, the categorization platform may improve accuracy of categorization (e.g., based on determining intra-dataset relationships), may reduce an amount of processing associated with categorization, etc., thereby conserving processor and/or memory resources of devices associated with the categorization.

Figure 1F:
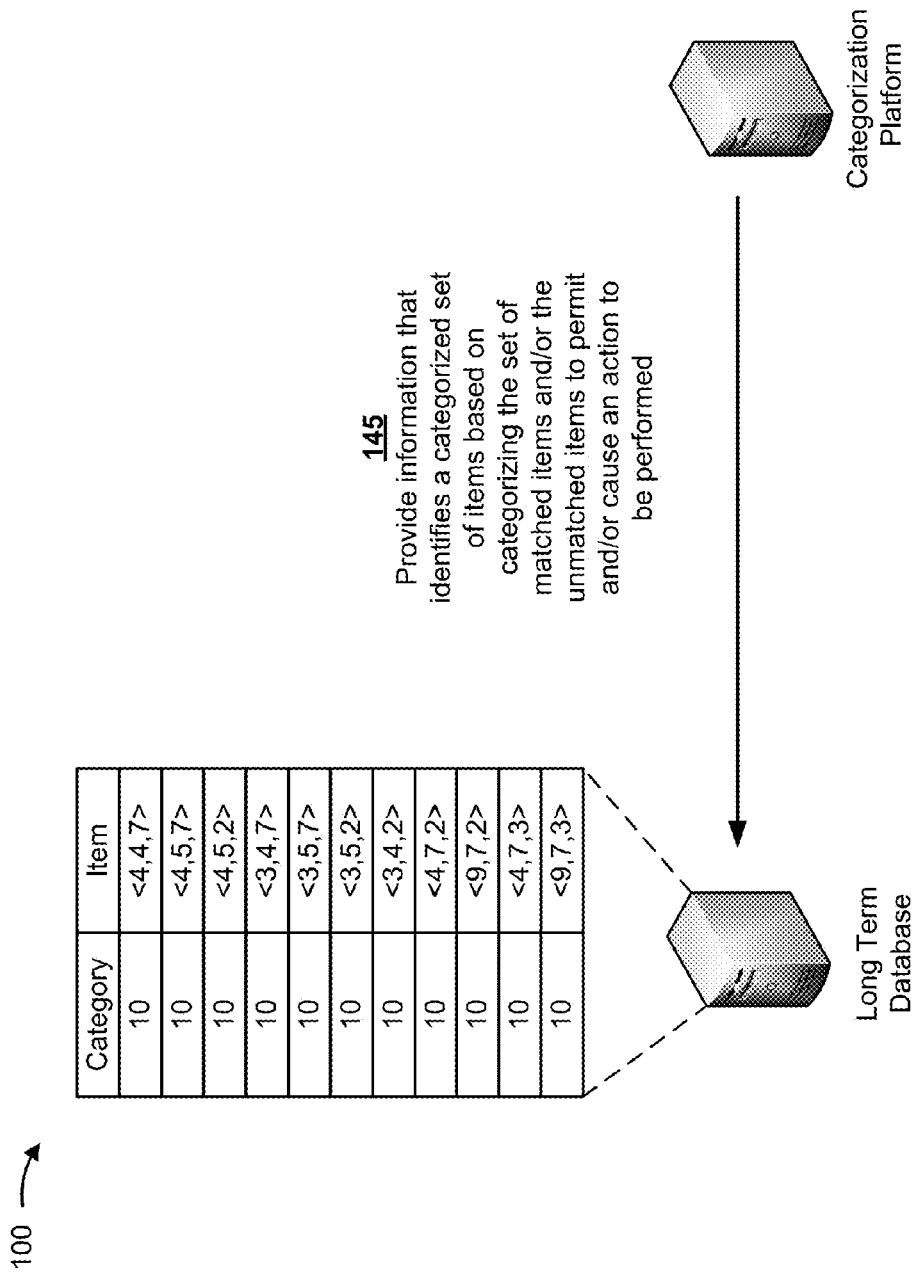

As shown in FIG. 1F, and by reference number 145, the categorization platform may provide information that identifies a categorized set of items based on categorizing the set of matched items and/or unmatched items to permit and/or cause an action to be performed. For example, the categorization platform may provide, to the long term database, information that identifies the set of items (e.g., vectors) and categorizations associated with the set of items (e.g., "<4, 7, 2>" is associated with category "10," etc.) to cause the long term database to update a set of categorized items. In this way, the long term database may store the information that identifies the set of categorized items, thereby enabling the categorization platform to perform additional categorizations (e.g., in association with other sets of items) using the categorized set of items.

Figure 1G:
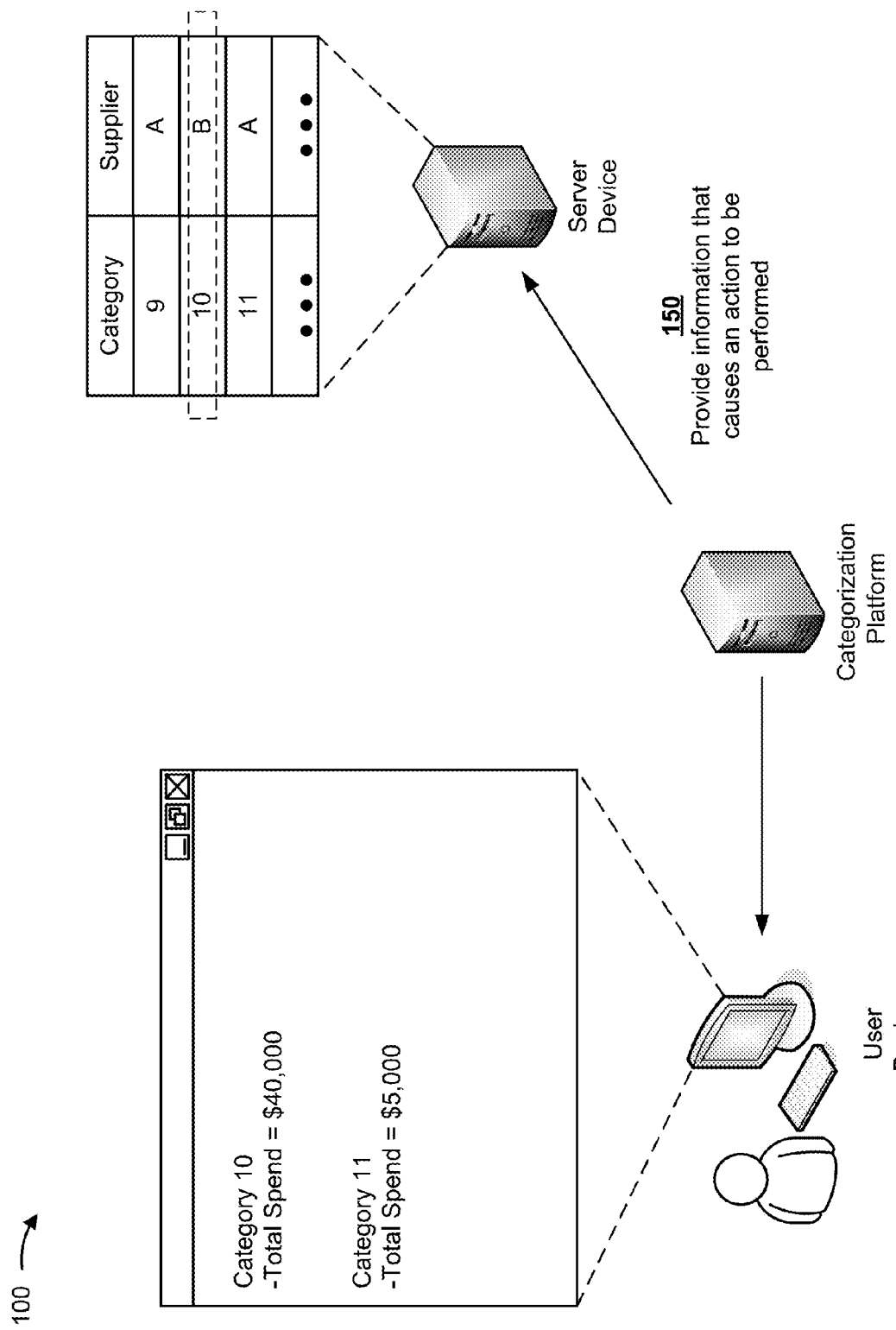

As shown in FIG. 1G, and by reference number 150, the categorization platform may provide information that causes an action to be performed. For example, the categorization platform may provide, to a user device (e.g., a computing device), information that identifies spend associated with particular categories. For example, the categorization platform may determine spend associated with particular items, and determine spend associated with a category based on aggregating spend associated with items categorized in association with the category. Additionally, or alternatively, the categorization platform may provide, to a server device, information that causes a procurement policy associated with the entity to be adjusted. For example, assume that the entity is procuring goods from a first supplier (e.g. "Supplier A"), and that the spend associated with a particular category of goods (e.g., "Category 10") satisfies a threshold. In this case, the categorization platform may cause a procurement policy to be adjusted such that other goods, associated with "Category 10," are procured from a different supplier (e.g., "Supplier B"). In this way, the categorization platform may identify procurement opportunities for the entity based on item categorization and/or spend analysis.

Implementations described herein enable the categorization platform to categorize sets of items based on mapping the items to vectors, comparing the vectors to vectors of categorized items and/or vectors of other items of the set of items, and determining similarity values. In this way, the categorization platform may reduce an amount of processing associated with categorization, may more accurately categorize items, etc., thereby conserving processor and/or memory resources associated with devices involved with the categorization.

As indicated above, FIGS. 1A-1G are provided merely as an example. Other examples are possible and may differ from what was described with regard to FIGS. 1A-1G.

Figure 2:
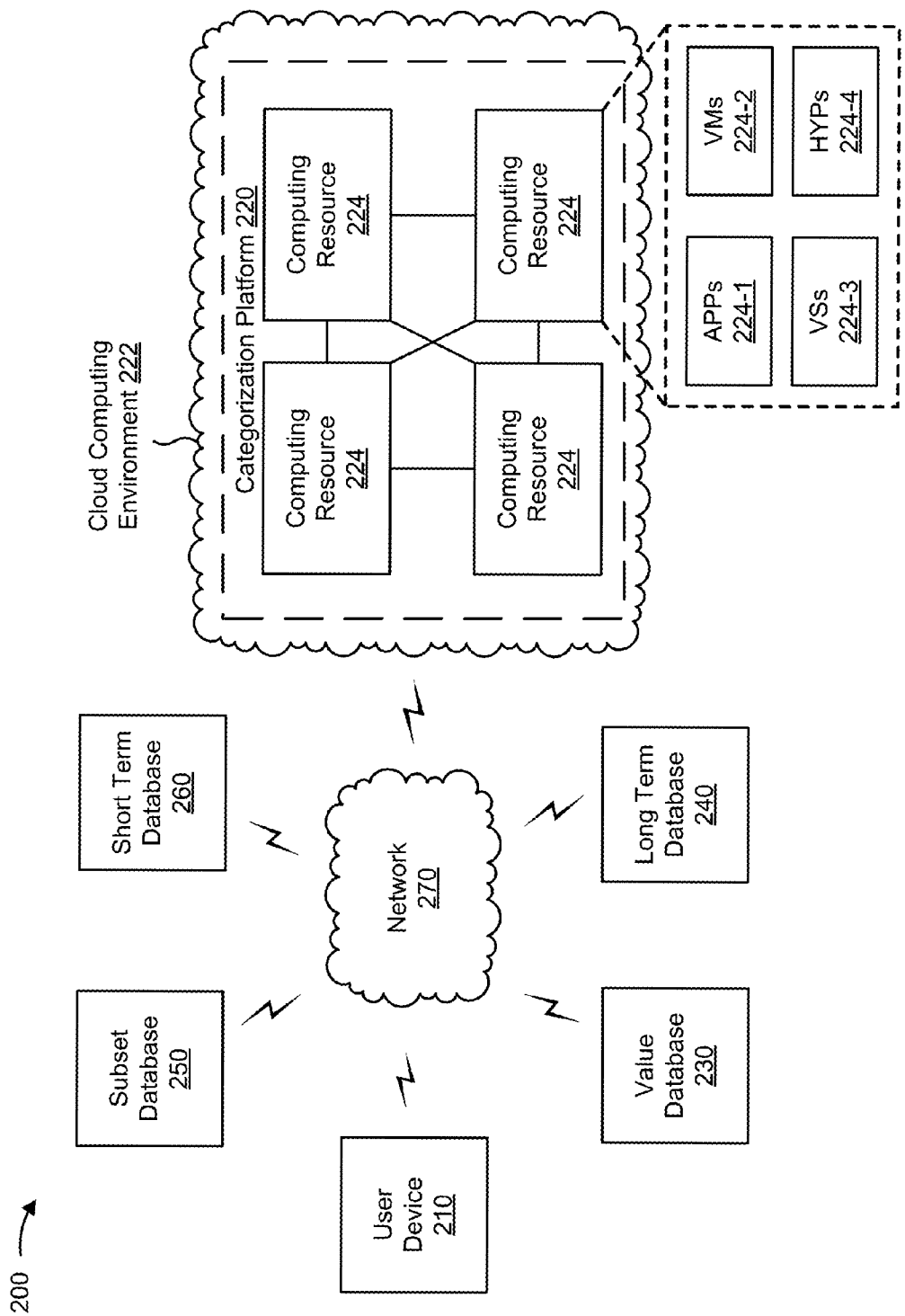
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user device 210, a categorization platform 220, a value database 230, a long term database 240, a subset database 250, a short term database 260, and a network 270. Devices of environment 200 may interconnect via wired connections, wireless connections, or a combination of wired and wireless connections.

User device 210 includes one or more devices capable of receiving, generating, storing, processing, and/or providing information associated with items to be categorized. For example, user device 210 may include a computing device, such as a desktop computer, a laptop computer, a tablet computer, a handheld computer, a server device, a mobile phone (e.g., a smart phone or a radiotelephone), a wearable communication device (e.g., a smart wristwatch, an activity band, or a pair of smart eyeglasses), a gaming device, or a similar type of device.

Categorization platform 220 includes one or more devices capable of receiving information that identifies items to be categorized, mapping the items to vectors, and categorizing the items based on the vectors, as described elsewhere herein. In some implementations, categorization platform 220 may be designed to be modular such that certain software components can be swapped in or out depending on a particular need. As such, categorization platform 220 may be easily and/or quickly reconfigured for different uses.

In some implementations, as shown, categorization platform 220 may be hosted in cloud computing environment 222. Notably, while implementations described herein describe categorization platform 220 as being hosted in cloud computing environment 222, in some implementations, categorization platform 220 may not be cloud-based (i.e., may be implemented outside of a cloud computing environment) or may be partially cloud-based.

Cloud computing environment 222 includes an environment that hosts categorization platform 220. Cloud computing environment 222 may provide computation, software, data access, storage, etc. services that do not require end-user (e.g., user device 210) knowledge of a physical location and configuration of system(s) and/or device(s) that hosts categorization platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host categorization platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, or the like.

Application 224-1 includes one or more software applications that may be provided to or accessed by client device 205. Application 224-1 may eliminate a need to install and execute the software applications on client device 205. For example, application 224-1 may include software associated with categorization platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., client device 205), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Value database 230 includes one or more devices capable of receiving, storing, and/or providing information for use by categorization platform 220. For example, value database 230 may include a server or a group of servers. In some implementations, value database 230 may provide, to categorization platform 220, information and/or resources. For example, value database 230 may store information that identifies values that are mapped to terms.

Long term database 240 includes one or more devices capable of receiving, storing, and/or providing information for use by categorization platform 220. For example, long term database 240 may include a server or a group of servers. In some implementations, long term database 240 may provide, to categorization platform 220, information and/or resources. For example, long term database 240 may store information that identifies a category and a set of vectors and/or items that are associated with the category. For example, a category may include a set of vectors that are associated with the category.

Subset database 250 includes one or more devices capable of receiving, storing, and/or providing information for use by categorization platform 220. For example, subset database 250 may include a server or a group of servers. In some implementations, subset database 250 may provide, to categorization platform 220, information and/or resources. For example, subset database 250 may store a subset of vectors associated with long term database 240.

Short term database 260 includes one or more devices capable of receiving, storing, and/or providing information for use by categorization platform 220. For example, short term database 260 may include a server or a group of servers. In some implementations, short term database 260 may provide, to categorization platform 220, information and/or resources. For example, short term database 260 may store unmatched items and/or matched items, as described elsewhere herein.

Network 270 may include one or more wired and/or wireless networks. For example, network 270 may include a cellular network (e.g., a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

FIG. 3 is a diagram of example components of a device 300. Device 300 may correspond to user device 210, categorization platform 220, value database 230, long term database 240, subset database 250, and/or short term database 260. In some implementations, user device 210, categorization platform 220, value database 230, long term database 240, subset database 250, and/or short term database 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4A:
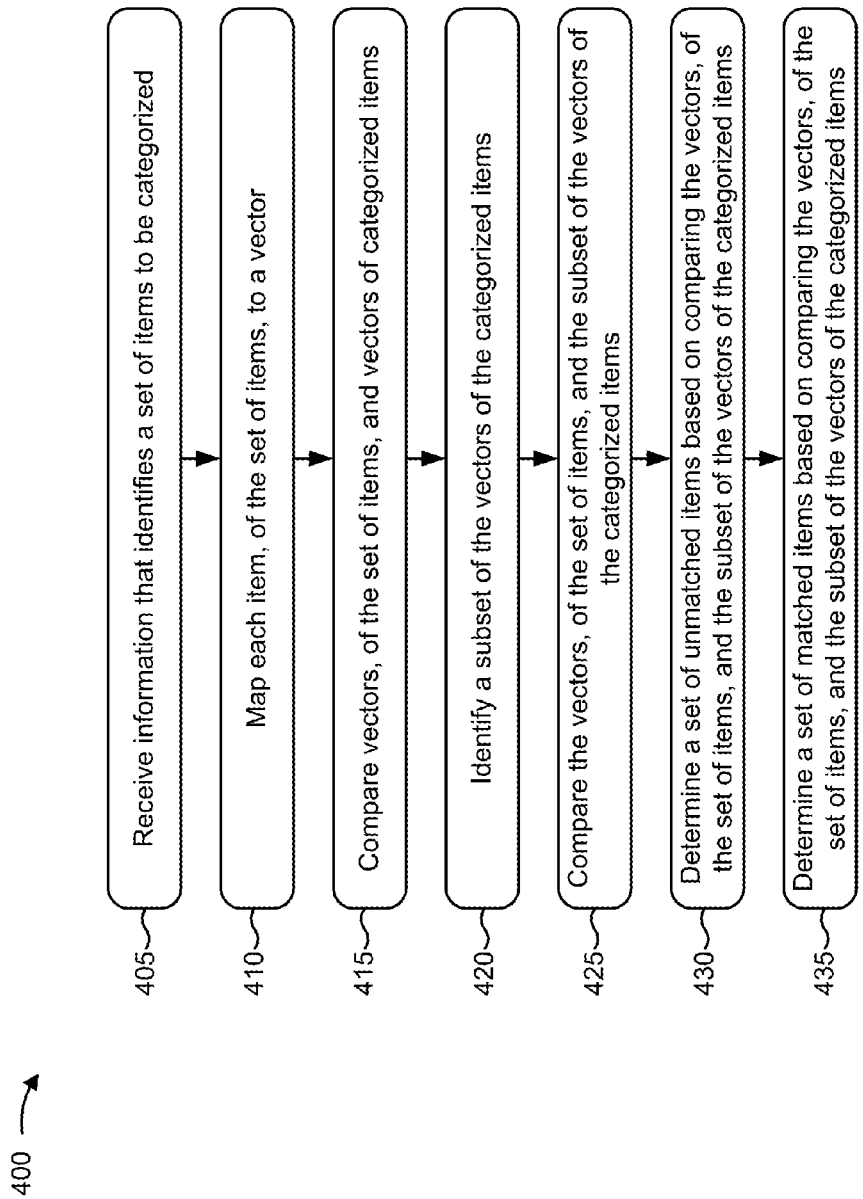
FIGS. 4A and 4B are flow charts of an example process for performing item to vector based categorization.
Figure 4B:
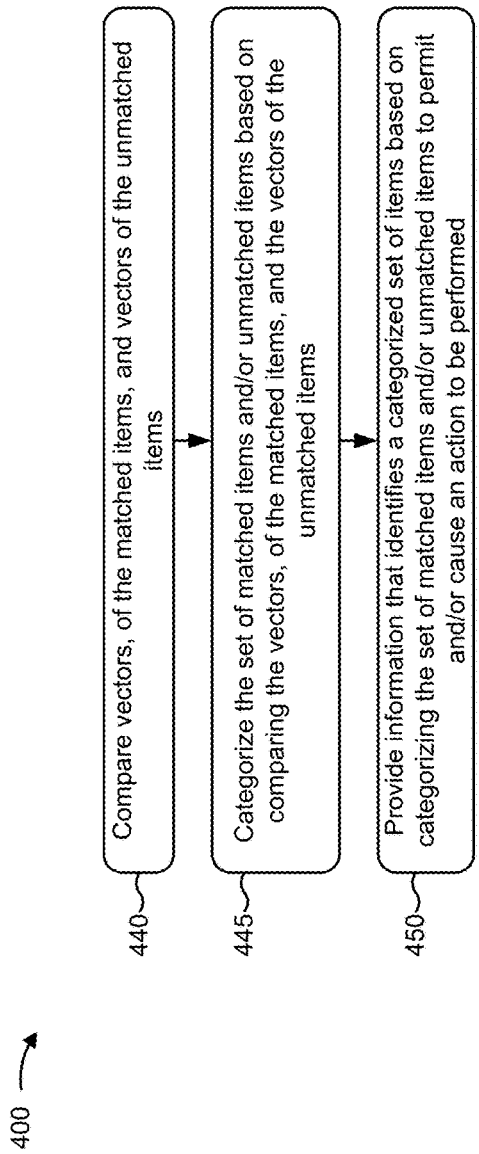

FIGS. 4A and 4B are flow charts of an example process 400 for performing item to vector based categorization. In some implementations, one or more process blocks of FIGS. 4A and 4B may be performed by categorization platform 220. In some implementations, one or more process blocks of FIGS. 4A and 4B may be performed by another device or a group of devices separate from or including categorization platform 220, such as user device 210, value database 230, long term database 240, subset database 250, and/or short term database 260.

As shown in FIG. 4A, process 400 may include receiving information that identifies a set of items to be categorized (block 405). For example, categorization platform 220 may receive, from user device 210, information that identifies a set of items to be categorized. In some implementations, an item may include text, such as a term, a set of terms (e.g., a sentence), etc. that are to be categorized. For example, particular items, of the set of items, may be associated with a particular category, associated with other items, identified by a particular relationship, or the like.

In some implementations, categorization platform 220 may receive, from user device 210 (e.g., which may have received an input from a user), information that identifies the set of items. In some implementations, categorization platform 220 may be configured to receive the information that identifies the set of items (without any interaction with user device 210). In some implementations, categorization platform 220 may utilize the information to categorize the set of items, as described elsewhere herein.

In some implementations, the information may include a resource that includes text (e.g., a document, a webpage, or the like). Additionally, or alternatively, the information may include a resource identifier (e.g., a uniform resource identifier (URI), a uniform resource locator (URL), a uniform resource name (URN), a network address, a database address, or the like). Additionally, or alternatively, the resource may be associated with a particular file type and/or format (e.g., a hypertext markup language (HTML) file, an extensible markup language (XML) file, a text file, a comma-separated values (CSV) file, a portable document format (PDF) file, a word processing file, a spreadsheet file, a zipped file, or the like). Additionally, or alternatively, the resource may be associated with a particular source (e.g., a source that generated the information associated with the resource, a device that stores the resource, or the like). In some implementations, the information may include multiple resources (e.g., documents, webpages, etc.) that are associated with different file types and/or different sources.

In some implementations, categorization platform 220 may obtain a resource based on the information (e.g., based on one or more resource identifiers). For example, categorization platform 220 may receive, from user device 210, information that identifies text and/or a memory location at which the text is stored. In some implementations, categorization platform 220 may be configured to receive the information that identifies the text, and/or obtain the resource (without any interaction with user device 210). Additionally, or alternatively, categorization platform 220 may perform a technique (e.g., a web crawling technique, a web scraping technique, a data mining technique, a web searching technique, a database searching technique, or the like), and receive the information including the set of items based on the technique. In some implementations, categorization platform 220 may provide requests, to external information sources (e.g., external server devices, or the like), for the information.

In some implementations, categorization platform 220 may obtain text and prepare the text for processing to identify items. In some implementations, categorization platform 220 may determine text sections to be processed. For example, categorization platform 220 may determine a manner in which the text is to be partitioned into text sections, and partition the text into text sections. A text section may include, for example, a sentence, a line, a paragraph, a table, a page, a document, or the like. In some implementations, categorization platform 220 may process each text section separately (e.g., serially or in parallel). By partitioning the text into text sections, categorization platform 220 may not have to process each text section of the text, thereby conserving processor and/or memory resources.

In some implementations, categorization platform 220 may prepare the text for processing (e.g., one or more text sections). For example, categorization platform 220 may standardize the text to prepare the text for processing. As an example, the text may be associated with different file types and/or different file formats, and/or include particular discrepancies relating to other text. In this way, categorization platform 220 may standardize the text, such that the text may be represented in a particular format, thereby conserving processor and/or memory resources by enabling more efficient processing.

In some implementations, categorization platform 220 may prepare the text for processing by performing an NLP technique, performing optical character recognition (OCR), adjusting characters in the text, such as by removing characters, replacing characters, adding characters, adjusting a font, adjusting formatting, adjusting spacing, removing white space, or the like. For example, categorization platform 220 may remove particular characters (e.g., non-alphanumeric characters, or the like), replace multiple spaces with a single space, may insert a space after a left parenthesis, a left brace, a left bracket, etc., may insert a space before a right parenthesis, a right brace, a right bracket, etc. In this way, categorization platform 220 may use a space delimiter to more easily parse the text, thereby improving accuracy of the use of the text and/or thereby conserving processor and/or memory resources. In some implementations, categorization platform 220 may further prepare the text for processing by expanding acronyms in the text, determining words in the text (e.g., by determining characters identified by one or more delimiting characters), associating part-of-speech tags (POS tags) with words in the text, or the like. In this way, categorization platform 220 may improve the accuracy of the use of the text, thereby conserving processor and/or memory resources.

In some implementations, categorization platform 220 may identify items included in the text, and generate a corpus of items by generating a data structure that stores items extracted from the text. In some implementations, an item may include a set of terms. For example, a term may refer to a set of characters, such as a single character, multiple characters (e.g., a character string), a combination of characters that form multiple words (e.g., a multi-word term, such as a phrase, a sentence, or a paragraph), a combination of characters that form an acronym, a combination of characters that form an abbreviation of a word, a combination of characters that form a misspelled word, or the like. By generating the data structure that stores items extracted from the text, categorization platform 220 may process the text more efficiently than if the text was processed without first generating the data structure, thereby conserving processor and/or memory resources.

In some implementations, categorization platform 220 may identify items included in the text based on a text section. Additionally, or alternatively, categorization platform 220 may identify a set of items based on a set of text sections. That is, a particular text section may correspond to a particular item. In some implementations, categorization platform 220 may identify the set of items, and map each item to a vector, as described below.

As further shown in FIG. 4A, process 400 may include mapping each item, of the set of items, to a vector (block 410). For example, categorization platform 220 may map an item, of the set of items, to a vector based on assigning a set of values to the item. In some implementations, categorization platform 220 may assign a set of values to an item, and map the item to a vector in a dimensional metric space (e.g., an n-dimensional space, where n=1, 2, 3, 10, etc.) based on the set of values. In some implementations, categorization platform 220 may assign a value (e.g., an integer value, an alphanumeric value, or the like) to each term, of the item, and map the item to a vector based on assigning a value to each term of the item. That is, a vector may include a set of values that are associated with respective terms of the item.

In some implementations, categorization platform 220 may map an item to a vector that includes n values (e.g., 10 values, 9 values, 15 values, etc.). In some implementations, categorization platform 220 may identify a term associated with an item, identify a value associated with the term, and assign the value to the term. For example, categorization platform 220 may receive, from value database 230, information that maps values to terms. In some implementations, categorization platform 220 may identify (e.g., based on performing a lookup using value database 230) a value associated with a term, and assign the value to the term. Additionally, or alternatively, categorization platform 220 may identify a term, perform a lookup using value database 230, and not identify a corresponding value (e.g., categorization platform 220 may not have previously processed the particular term and/or value database 230 may not include information associated with the particular term). In this case, categorization platform 220 may assign a value to the term, and provide, to value database 230, information that associates the value and the term.

In some implementations, an item may include n terms that correspond to the n values associated with the vector. In this case, categorization platform 220 may identify n values, and may assign the n values to the n terms, respectively. Alternatively, an item may include m terms, where m<n. In this case, categorization platform 220 may identify m values, and assign the m values to the m terms, respectively. Additionally, categorization platform 220 may assign particular values (e.g., a particular integer value, such as zero, or the like) to the item, such that the item includes a vector of n values. For example, assume that an item (e.g., a sentence) includes three terms. In this case, categorization platform 220 may identify three values (e.g., 4, 7, 9, respectively) for the three terms using value database 230, and may assign particular values to the remaining seven values of the vector, such that the vector includes the values <4, 7, 9, 0, 0, 0, 0, 0, 0, 0>.

In some implementations, an item may include p terms, where p>n. In this case, categorization platform 220 may identify n terms of the item (e.g., the first n terms, the last n terms, a combination of particular terms, or the like), identify values that correspond to the n terms, and assign the n values to the n terms, such that the item is mapped to a vector of n values. For example, assume that the item includes fifty terms. In this case, and as an example, categorization platform 220 may identify the first n terms of the item, and map the item to a vector based on the n terms. By using particular terms (e.g., the first n terms), categorization platform 220 may more accurately categorize the item than as compared to if categorization platform 220 uses other terms of the item to map the item to the vector, thereby conserving processor and/or memory resources of categorization platform 220. That is, particular terms (e.g., the first ten terms, the first five terms, or the like) of the item may more accurately identify what the item may be (e.g., for categorization purposes).

In some implementations, categorization platform 220 may map each item, of the information that identifies the set of items, to a vector, and may compare the vectors of the items to vectors associated with categorized items, as described below.

As further shown in FIG. 4A, process 400 may include comparing vectors, of the set of items, and vectors of categorized items (block 415), and identifying a subset of the vectors of the categorized items (block 420). For example, categorization platform 220 may compare the vectors of the items and vectors of categorized items (e.g., using long term database 240), and may identify a subset of vectors of the categorized items based on the comparison.

In some implementations, categorization platform 220 may compare values related to particular elements, of the vectors of the set of items, and values related to corresponding elements of the vectors of the categorized items. For example, assume that a first item, of the set of items, includes the vector <8, 2, 24, 5, 456, 9, 1, 18, 146, 3000>. In this case, categorization platform 220 may identify vectors, of the categorized items, that include a value of 8 for the first element of the vector, a value of 2 for the second element of the vector, or a value of 24 for the third element of the vector, etc. In other words, categorization platform 220 may identify vectors, of the categorized items, that include at least a threshold number of values that match a value of a vector of an item with respect to a particular element of the vector.

In some implementations, categorization platform 220 may identify vectors of the categorized items that include particular values, associated with particular elements, that match values of the set of items corresponding to the particular elements, and store the vectors of the categorized items using subset database 250. Additionally, or alternatively, categorization platform 220 may identify vectors of the categorized items that include a threshold number of values that match corresponding values of a vector of the set of items, and store the vectors of the categorized items based on the number satisfying the threshold. In this way, categorization platform 220 may identify a subset of the vectors, of the categorized items, that match at least a value of a vector of an item, a threshold number of values, or the like. In this way, categorization platform 220 may reduce an amount of processing for categorization of items by identifying a subset of the vectors, of the categorized items, that may be more likely to match the items to be categorized, as described elsewhere herein. In this way, categorization platform 220 may conserve processor and/or memory resources.

As further shown in FIG. 4A, process 400 may include comparing the vectors, of the set of items, and the subset of the vectors of the categorized items (block 425). For example, categorization platform 220 may compare the vectors, of the set of items, and the subset of vectors of the categorized items (e.g., using subset database 250). In some implementations, categorization platform 220 may perform a first comparison (e.g., as described above in connection with block 415), and a second comparison (e.g., as described in block 425). Additionally, the first comparison and the second comparison may include different techniques. That is, the first comparison and the second comparison may identify different relationships between the items and the categorized items.

In some implementations, categorization platform 220 may compare a vector, of the set of items, and a vector of the categorized items (e.g., associated with the subset of vectors of the categorized items). Additionally, or alternatively, categorization platform 220 may determine a similarity value between a vector, of the set of items, and a vector of the categorized items. In some implementations, the similarity value may include a hamming distance value. For example, a hamming distance value may include a metric that identifies an amount (e.g., minimum number) of substitutions and/or transformations to change one string into another string (e.g., a first item into a second item, or the like). While some implementations described herein describe determining a similarity value based on a hamming distance value, other implementations may implement other types of similarity values, such as Damerau-Levenshtein distance values, Euclidean distance values, Mahalanobis distance values, Sorensen-Dice coefficient values, or the like.

In some implementations, categorization platform 220 may determine a similarity value (e.g., a hamming distance value) between a vector of an item and a vector of a categorized item. In some implementations, if the amount of terms in the item matches an amount of terms of the categorized item (e.g., an amount of non-zero integer values of the item does not match an amount of non-zero integer values of the categorized item, where zero is the integer value assigned to generate vectors of n values), then categorization platform 220 may determine a similarity value based on the following expression:

$$d(s_1, s_2) = l(s_1) - m$$

In the above expression, "d" may represent the hamming distance value between a first item "$s_1$" and a second item "$s_2$," "$l(s_1)$" may represent the amount of terms included in the first item, and "m" may represent the amount of terms that are shared between the first item and the second item in corresponding elements. For example, categorization platform 220 may determine a hamming distance value of one between a first item (e.g., a vector including <3, 4, 9>) and a second item (e.g., a vector including <3, 4, 25>). That is, the only value that is different between the two vectors in in relation to the third element. In other words, one substitution would change the first vector into the second vector, and vice versa.

In some implementations, if the amount of terms of the item does not match an amount of terms of the categorized item (e.g., the item and the categorized item include a different amount of terms), then categorization platform 220 may determine a similarity value based on the following expression:

$$d(s_1, s_2) = |l(s_1) - l(s_2)| + (l(s_1) - m)$$

For example, categorization platform 220 may implement the above expression where an item includes fewer terms than n (e.g., where the categorized item includes n terms).

In some implementations, categorization platform 220 may compare a vector of an item, of the set of items, and a vector of a categorized item, determine a similarity value, and determine a set of unmatched items and/or matched items, as described elsewhere herein.

As further shown in FIG. 4A, process 400 may include determining a set of unmatched items based on comparing the vectors, of the set of items, and the subset of vectors of the categorized items (block 430). For example, categorization platform 220 may determine a set of unmatched items based on comparing the vectors, of the set of items, and the subset of vectors of the categorized items (e.g., using subset database 250). In some implementations, an unmatched item may include an item, of the set of items, that is associated with a similarity value that does not satisfy a threshold (e.g., in relation to a categorized item of long term database 240).

In some implementations, categorization platform 220 may determine a similarity value for a vector of an item and a vector of a categorized item, determine that the similarity value does not satisfy a threshold, and determine an unmatched item based on the similarity value not satisfying the threshold (e.g., a hamming distance value of 2, 3, 5 etc.). Additionally, or alternatively, if the item and the categorized item include the same amount of terms, then categorization platform 220 may determine an unmatched item based on the following expression:

$$d(s_1, s_2) < m$$

For example, as shown in the above expression, categorization platform 220 may determine an unmatched item if a similarity value between a vector of an item and a vector of a categorized item satisfies (or does not satisfy) an amount of terms that are shared between the item and the categorized item.

In some implementations, if the item and the categorized item include a different amount of terms, then categorization platform 220 may determine an unmatched item based on the following expression:

$$|l(s_1) - l(s_2)| < -l(s_1) + 2m$$

For example, as shown in the above expression, categorization platform 220 may determine an unmatched item if an absolute value of a difference between a length of an item and a categorized item satisfies (or does not satisfy) a difference between twice the amount of terms that are shared between the item and the categorized item and the amount of terms included in the item.

In some implementations, categorization platform 220 may compare a vector of an item to each respective vector of the categorized items, determine a set of respective similarity values, and determine that the item is an unmatched item if each similarity value does not satisfy a threshold, if one of the above expressions is satisfied or is not satisfied, or the like. Additionally, or alternatively, categorization platform 220 may store the unmatched item in short term database 260.

In some implementations, categorization platform 220 may compare unmatched items (e.g., unmatched items stored in short term database 260). For example, categorization platform 220 may determine a similarity value between a vector of a first unmatched item and a vector of a second unmatched item. Additionally, or alternatively, categorization platform 220 may determine a match between a first unmatched item and a second unmatched item based on a similarity value between respective vectors of the first unmatched item and the second unmatched item (e.g., may determine that a similarity value satisfies a threshold, or the like). Additionally, or alternatively, categorization platform 220 may store information that identifies matches between particular unmatched items, and compare vectors of matched items and vectors of unmatched items, as described elsewhere herein.

As further shown in FIG. 4A, process 400 may include determining a set of matched items based on comparing the vectors, of the set of items, and the subset of vectors of the categorized items (block 435). For example, categorization platform 220 may determine a set of matched items based on comparing the vectors, of the set of items, and the subset of vectors of the categorized items. In some implementations, a matched item may include an item, of the set of items, that includes a similarity value that satisfies a threshold (e.g., in relation to a categorized item of long term database 240).

In some implementations, categorization platform 220 may determine a similarity value for a vector of an item and a vector of a categorized item, determine that the similarity value satisfies a threshold, and determine a matched item based on the similarity value satisfying the threshold. Additionally, or alternatively, categorization platform 220 may determine a matched item based on one of the expressions, as described above in connection with block 430, being satisfied (or not being satisfied). In some implementations, categorization platform 220 may determine a matched item, identify a category associated with the categorized item, and categorize the matched item based on the category, as described elsewhere herein.

As shown in FIG. 4B, process 400 may include comparing vectors, of the matched items, and vectors of the unmatched items (block 440). For example, categorization platform 220 may compare vectors, of the matched items, and vectors of the unmatched items. In some implementations, categorization platform 220 may determine a matched item, as described above in connection with block 435, and may compare the vector, of the matched item, and a vector of an unmatched item (e.g., stored in short term database 260). That is, categorization platform 220 may perform an intra-dataset comparison of vectors (e.g., compare items of the same dataset to perform categorization).

In some implementations, categorization platform 220 may determine a match between a matched item and an unmatched. For example, categorization platform 220 may determine a similarity value between a vector of the matched item and a vector of the unmatched item, determine that the similarity value satisfies a threshold, and determine a match between the matched item and the unmatched item. In this way, categorization platform 220 may categorize a matched item and an unmatched item, as described below.

As further shown in FIG. 4B, process 400 may include categorizing the set of matched items and/or unmatched items based on comparing the vectors, of the matched items, and the vectors of the unmatched items (block 445). For example, categorization platform 220 may categorize the set of matched items and/or the set of unmatched items based on comparing the vectors, of the matched items, and the vectors of the unmatched items.

In some implementations, categorization platform 220 may categorize a matched item based on a category of the categorized item that is associated with the similarity value that satisfies the threshold. Additionally, or alternatively, categorization platform 220 may categorize an unmatched item based on determining a match between the unmatched item and the matched item. As an example, assume that the matched item and a categorized item are associated with a similarity value that satisfies a threshold. Additionally, assume that the unmatched item and the categorized item are associated with a similarity value that does not satisfy a threshold. Further still, assume that the matched item and the unmatched item are associated with a similarity value that satisfies a threshold. In this case, categorization platform 220 may categorize the unmatched item based on a category associated with the categorized item (e.g., because the matched item is associated with the category, and the matched item and the unmatched item are similar based on similarity values).

Additionally, or alternatively, categorization platform 220 may categorize a first unmatched item based on a match between the first unmatched item and a second unmatched item. For example, the second unmatched item may match a matched item (e.g., based on a similarity value). Additionally, the first unmatched item may not match the matched item. However, the first unmatched item may match the second unmatched item. In this way, categorization platform 220 may categorize the matched item, the first unmatched item, and the second unmatched item based on a category associated with the categorized item (e.g., that matched the matched item). Additionally, or alternatively, continuing with the example, categorization platform 220 may categorize a third unmatched item based on a match between the third unmatched item and the first unmatched item. In other words, categorization platform 220 may categorize multiple unmatched items based on respective similarity values between the unmatched items.

In some implementations, categorization platform 220 may categorize multiple unmatched items based on a similarity value between a matched item and an unmatched item, of the multiple items, satisfying a threshold. In this way, categorization platform 220 may categorize multiple items (e.g., matched items, unmatched items, etc.) simultaneously, thereby reducing an amount of processing associated with categorization and thereby conserving processor and/or memory resources of categorization platform 220.

Additionally, in this way, categorization platform 220 may categorize items, associated with a particular resource (e.g., input file, or the like), based on determining similarity values between the items (e.g., based on intra-dataset comparison(s)). For example, particular items, associated with the same resource, may be more likely to be associated with other items of the resource. Thereby, categorization platform 220 may increase the accuracy of categorization based on comparing items associated with the same resource (e.g., the set of items to be categorized).

In some implementations, categorization platform 220 may categorize a first set of items, associated with a first entity (e.g., a first resource, or the like), based on categorizations associated with a second set of items that are associated with a second entity (e.g., a second resource, or the like). In this way, categorization platform 220 may determine categorized items associated with a first entity, and may categorize a set of items associated with a second entity based on the categorized items associated with the first entity, thereby increasing an accuracy of categorization (e.g., where the first entity and the second entity may be related, such as where the entities are competitors, share similar traits, etc.), and thereby conserving processor and/or memory resources.

In some implementations, categorization platform 220 may categorize an item based on performing a technique. For example, categorization platform 220 may use one or more machine learning techniques to analyze data (e.g., training data, such as data that identifies categorizations, etc.) and create models. The techniques may include, for example, supervised and/or unsupervised techniques, such as artificial networks, case-based reasoning, Bayesian statistics, learning automata, Hidden Markov Modeling, linear classifiers, quadratic classifiers, decision trees, association rule learning, or the like.

Additionally, or alternatively, categorization platform 220 may use another kind of computer-implemented technique, such as artificial intelligence, machine perception, or computer vision, to analyze data and generate models. As an example, categorization platform 220 may receive information that identifies an item, a vector associated with the item, and information that identifies a category associated with the item and/or vector, and may implement a technique (e.g., to train a model). In this way, categorization platform 220 may receive additional information that identifies items to be categorized, and may determine categorizations based on the model. Additionally, or alternatively, categorization platform 220 may implement the technique based on providing information that identifies the categorized set of items, as described below.

As further shown in FIG. 4B, process 400 may include providing information that identifies a categorized set of items based on categorizing the set of matched items and/or unmatched items to permit and/or cause an action to be performed (block 450). For example, categorization platform 220 may provide information that identifies a categorized set of items based on categorizing the set of matched items and/or the set of unmatched items to permit and/or cause an action to be performed.

In some implementations, categorization platform 220 may provide, to long term database 240, information that the categorized set of items to cause long term database 240 to be updated. For example, long term database 240 may receive the information, and may store vector values and categories associated with the categorized set of items (e.g., to be used for additional categorization of sets of items). In this way, categorization platform 220 may receive additional information that identifies other sets of items to be categorized, may categorize the other sets of items based on the categorized set of items. Additionally, in this way, categorization platform 220 may increase accuracy of categorization based on providing additional information that identifies categorized items to long term database 240 (e.g., to update long term database 240), thereby conserving processor and/or memory resources of categorization platform 220.

In some implementations, categorization platform 220 may provide, to user device 210, information that identifies the set of categorized items to permit and/or cause user device 210 to provide the information for display (e.g., statistics, graphs, a report, etc.). For example, user device 210 may provide, for display, information that identifies the set of categorized items. In some implementations, categorization platform 220 may provide a resource (e.g., an output file) that includes a modification of another resource (e.g., an input file, such as a file that includes the set of items to be categorized, as described above in connection with block 405). For example, the output file may include information associated with the input file and information associated with the categorized set of items.

In some implementations, categorization platform 220 may receive information that identifies a set of items to be categorized (e.g., as described above in connection with block 405), map each item, of the set of items to a vector (e.g., as described above in connection with block 410), and compare the vectors, of the set of items, and vectors of categorized items (e.g., categorized items associated with long term database 240). Additionally, or alternatively, categorization platform 220 may determine a matched item (e.g., as described above in connection with block 435), and provide information that identifies the matched item to long term database 240 (and/or user device 210). Additionally, or alternatively, categorization platform 220 may determine an unmatched item, and repetitively compare a vector of the unmatched item to vectors of categorized items. In other words, categorization platform 220 may compare and/or categorize other items of the set of items, and subsequently compare a vector of the unmatched item to the categorized items (e.g., after particular items of the set of items have been categorized and/or provided to long term database 240). In this way, categorization platform 220 may categorize a previously unmatched item based on processing other items of the set of items.

In some implementations, categorization platform 220 may permit and/or cause another action to be performed based on categorizing the set of matched items and/or unmatched items. For example, categorization platform 220 may cause a message (e.g., an email or a short message service (SMS) message) to be sent to user device 210 based on the categorizations and/or based on another metric associated with the categorizations (e.g., an amount of items that are associated with a particular category, spend associated with a category, or the like). In this way, categorization platform 220 may notify a user of particular information associated with a categorization and may reduce a need of the user to cause user device 210 to perform a search for the information, thereby conserving processing and/or memory resources of user device 210.

Additionally, or alternatively, categorization platform 220 may coordinate user devices 210 based on the categorizations. For example, categorization platform 220 may coordinate user devices 210 (e.g., coordinate calendar applications associated with user devices 210 to schedule a meeting), and may provide information identifying categorizations and/or metrics associated with the categorizations (e.g., to be displayed in association with a calendar application). In this way, a user may receive an indication that a meeting has been scheduled to discuss the categorizations and/or the metrics. As an example, assume that spend associated with a particular category satisfies a threshold. In this way, a meeting may be scheduled to discuss procuring items associated with the particular category from another supplier. Additionally, in this way, categorization platform 220 may reduce a quantity of processing needed to identify information associated with the categorizations, thereby conserving processing and/or memory resources of user device 210.

Additionally, or alternatively, categorization platform 220 may cause a budget associated with an entity to be updated based on the categorizations and/or metrics associated with the categorizations. For example, categorization platform 220 may perform a spend analysis, and cause a budget to be updated to accommodate particular spending associated with a category (e.g., may allocate resources towards a particular category or may prevent resources from being allocated towards a particular category). Additionally, or alternatively, categorization platform 220 may cause accounting software to be modified. In this way, categorization platform 220 may conserve processor and/or memory resources of other devices associated with the spend analysis (e.g., by identifying particular categories and associated metrics).

Additionally, or alternatively, categorization platform 220 may cause a product and/or a service, associated with a particular entity (e.g., supplier, or the like), to be procured and/or requested based on categorizations and/or associated metrics. For example, assume that categorization platform 220 determines that spend associated with a particular entity, and/or a particular category, satisfies a threshold value. In this case, categorization platform 220 may cause goods and/or services associated with the entity to be discontinued from being procured, and/or may cause goods and/or services to be procured in association with another entity. In this way, categorization platform 220 may identify procurement opportunities based on categorizations and/or associated metrics, and reduce an amount of computing resources needed to perform the spend analysis, thereby conserving processor and/or memory resources of computing devices associated with the spend analysis.

Implementations described herein enable categorization of sets of items based on vector comparisons between the items and/or between the items and categorized items. Additionally, implementations described herein enable categorizations of multiple items simultaneously (e.g., based on a categorization of an item and an identification of related items). In this way, implementations described herein may conserve processor and/or memory resources of categorization platform 220 and/or other devices associated with item categorization.

Additionally, implementations described herein may conserve processor and/or memory resources by reducing a quantity of processing needed to perform categorization and/or analysis of the categorization.

Although FIGS. 4A and 4B show example blocks of process 400, in some implementations, process 400 may include additional blocks, fewer blocks, different blocks, or differently arranged blocks than those depicted in FIGS. 4A and 4B. Additionally, or alternatively, two or more of the blocks of process 400 may be performed in parallel.

Implementations described herein enable a device to receive information that identifies a set of items to be categorized, map the items to vectors based on assigning values to terms associated with the items, and compare the vectors to vectors of categorized items. In this way, implementations described herein enable the device to increase an accuracy of categorization based on identifying related items that share terms. Additionally, implementations described herein enable the device to compare vectors of the items and determine intra-dataset relatedness of items, and categorize items based on the intra-dataset relatedness. In this way, implementations described herein enable the device to more quickly perform processing of datasets and/or more accurately categorize items of the dataset, thereby conserving processor and/or memory resources of the device. Additionally, implementations described herein enable the device to implement machine learning techniques based on processing datasets, thereby increasing accuracy of categorization of additional datasets.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors to:
  receive information that identifies an item to be categorized, the item including a set of first terms;
  map the item to a first vector based on the set of first terms, the first vector including a set of first values that correspond to the set of first terms,
    a first term, from the set of first terms, being mapped to a first value, from the set of first values, and a second term, from the set of first terms, being mapped to a second value, from the set of first values;
  compare the first vector and a second vector associated with a categorized item,
    the second vector including a set of second values that correspond to a set of second terms associated with the categorized item,
    a first term, from the set of second terms, being mapped to a first value, from the set of second values, and the second term, from the set of second terms, being mapped to a second value, from the set of second values, and
    where the one or more processors when comparing the first vector and the second vector, are to:
      compare:
        the first value, from the set of first values, to the first value, from the set of second values, and
        the second value, from the set of first values, to the second value, from the set of second values;
  determine an amount of the first values that match the second values based on comparing the first vector and the second vector;
  determine a similarity value between the first vector and the second vector based on the amount of the first values that match the second values;
  determine that the similarity value satisfies a threshold;
  determine a category associated with the item based on the similarity value satisfying the threshold,
    the categorized item being associated with the category; and
  provide information that identifies the category associated with the item to permit and/or cause an action to be performed.

2. The device of claim 1, where the one or more processors are further to:
compare a third vector and the first vector,
  the third vector being associated with another item to be categorized;
determine that another similarity value between the third vector and the first vector satisfies the threshold;
determine that the other item is associated with the category based on the other similarity value satisfying the threshold; and
where the one or more processors, when providing the information that identifies the category associated with the item, are to:
  provide the information that identifies the category associated with the item and the other item.

3. The device of claim 1, where the one or more processors are further to:
compare the first vector and a first set of vectors, the first set of vectors including the second vector;
identify a second set of vectors based on comparing the first vector and the first set of vectors,
the second set of vectors including the second vector; and
where the one or more processors, when determining the similarity value between the first vector and the second vector, are to:
determine the similarity value based on identifying the second set of vectors.

4. The device of claim 1, where the one or more processors are further to:
determine a hamming distance value between the first vector and the second vector; and
where the one or more processors, when determining the similarity value, are to:
determine the similarity value based on the hamming distance value.

5. The device of claim 1, where the one or more processors are further to:
compare the first vector to a set of other vectors of other items to be categorized, the item and the other items being associated with a same dataset; and
determine that the other items are associated with the category based on comparing the first vector to the set of other vectors.

6. The device of claim 1, where the item to be categorized is a first item, and
where the similarity value is a first similarity value; and
where the one or more processors are further to:
compare a third vector and a fourth vector,
the third vector being associated with a second item to be categorized, and
the fourth vector being associated with a third item to be categorized;
determine that a second similarity value between the third vector and the fourth vector satisfies the threshold;
determine that a third similarity value between the second vector and the fourth vector does not satisfy the threshold;
determine that a fourth similarity value between the third vector and the first vector satisfies the threshold; and
categorize the third item based on the fourth similarity value satisfying the threshold,
the third item being associated with the category.

7. The device of claim 1, where the one or more processors, further cause the one or more processors to:
compare the first vector and a first set of vectors using a first technique;
identify a second set of vectors based on the first technique,
the second set of vectors including the second vector; and
where the one or more processors, when comparing the first vector and the second vector, are to:
compare the first vector and the second vector using a second technique that is different than the first technique based on identifying the second set of vectors.

8. A method, comprising:
receiving, by a device, information that identifies a first item to be categorized;
mapping, by the device, the first item to a first vector,
the first vector including a plurality of first values that correspond to a plurality of first terms of the first item,
a first term, from the plurality of first terms, being mapped to a first value, from the plurality of first values, and a second term, from the plurality of first terms, being mapped to a second value, from the plurality of first values;
comparing, by the device, the first vector and a second vector,
the second vector being associated with a second item, the second vector including a plurality of second values that correspond to a plurality of second terms associated with the second item,
a first term, from the plurality of second terms, being mapped to a first value, from the plurality of second values, and a second term, from the plurality of second terms, being mapped to a second value, from the plurality of second values, and
where comparing the first vector and the second vector, comprises:
comparing:
the first value, from the plurality of first values, to the first value, from the plurality of second values, and
the second value, from the plurality of first values, to the second value, from the plurality of second values;
determining, by the device, a similarity value associated with the first vector and the second vector based on comparing the first vector and the second vector;
determining, by the device, that the similarity value satisfies a threshold;
determining, by the device, a category associated with the first item based on the similarity value satisfying the threshold,
the second item being associated with the category; and
providing, by the device, information that identifies the category associated with the first item to permit an action to be performed.

9. The method of claim 8,
where determining that the similarity value satisfies the threshold comprises:
determining that the similarity value satisfies the threshold based on comparing the first value, from the plurality of first values, to the first value, from the plurality of second values, and the second value, from the plurality of first values, to the second value, from the plurality of second values.

10. The method of claim 8, further comprising:
identifying an amount of the plurality of first terms; and
generating the first vector based on the plurality of first terms,
the first vector including another amount of values that is different than the amount of the plurality of first terms.

11. The method of claim 8, further comprising:
comparing a third vector and the first vector;
determining that another similarity value between the third vector and the first vector satisfies the threshold; and
categorizing the third vector based on the other similarity value satisfying the threshold, the third vector being categorized in association with the category.

12. The method of claim 8, further comprising:
determining a first match between a third vector and the first vector;
determining a second match between a fourth vector and the first vector; and categorizing the third vector and the fourth vector to be associated with the category associated with the first vector,
   the first vector, the third vector, and the fourth vector being associated with a same dataset.

13. The method of claim 8, further comprising:
determining a hamming distance value between the first vector and the second vector; and
where determining the similarity value comprises:
   determining the similarity value based on the hamming distance value.

14. The method of claim 8, further comprising:
comparing the first vector and a first set of vectors using a first technique;
identifying a second set of vectors based on the first technique,
   the second set of vectors including the second vector; and
where comparing the first vector and the second vector comprises:
   comparing the first vector and the second vector using a second technique that is different than the first technique based on identifying the second set of vectors.

15. A non-transitory computer-readable medium storing instructions, the instructions comprising:
one or more instructions that, when executed by one or more processors, cause the one or more processors to:
   receive information that identifies an item to be categorized;
   map the item to a first vector based on the information that identifies the item,
      the information including a first set of values that correspond to a first set of terms,
         a first term, from the set of first terms, being mapped to a first value, from the set of first values, and a second term, from the set of first terms, being mapped to a second value, from the set of first values;
   compare the first vector to a second vector based on mapping the item to the first vector,
      the second vector including a set of second values that correspond to a set of second terms associated with the item,
         a first term, from the set of second terms, being mapped to a first value, from the set of second values, and a second term, from the set of second terms, being mapped to a second value, from the set of second values, and
      where the one or more instructions, that cause the one or more processors to compare the first vector and the second vector, cause the one or more processors to:
         compare:
            the first value, from the set of first values, to the first value, from the set of second values, and
            the second value, from the set of first values, to the second value, from the set of second values;
   determine a similarity value between the first vector and the second vector based on comparing the first vector and the second vector;
   determine that the similarity value satisfies a threshold;
   determine a category associated with the item based on the similarity value satisfying the threshold,
      the second vector being associated with the category; and
   provide information that identifies the category associated with the item to cause an action to be performed.

16. The non-transitory computer-readable medium of claim 15, where the one or more instructions, when executed by the one or more processors, further cause the one or more processors to:
   identify a set of other items that match the item,
      the set of other items and the item being associated with a same dataset; and
   where the one or more instructions, that cause the one or more processors to determine the category associated with the item, cause the one or more processors to:
      determine the category associated with the item and the set of other items based on the set of other items matching the item.

17. The non-transitory computer-readable medium of claim 15, where the one or more instructions, when executed by the one or more processors, further cause the one or more processors to:
   identify a first amount of terms associated with item;
   assign a set of values to a set of terms of the item,
      the set of terms including a second amount of terms that is different than the first amount of terms; and
   where the one or more instructions, that cause the one or more processors to map the item to the first vector, cause the one or more processors to:
      map the item to the first vector based on the set of values.

18. The non-transitory computer-readable medium of claim 15, where the one or more instructions, when executed by the one or more processors, further cause the one or more processors to:
   receive information that identifies another item to be categorized,
      the other item and the item being associated with different datasets;
   compare a third vector, associated with the other item, and the first vector; and
   determine the category associated with the third vector based on comparing the third vector and the first vector.

19. The non-transitory computer-readable medium of claim 15, where the similarity value includes a hamming distance value.

20. The non-transitory computer-readable medium of claim 15, where the one or more instructions, when executed by the one or more processors, further cause the one or more processors to:
   compare the first vector and a first set of vectors using a first technique;
   identify a second set of vectors based on the first technique,
      the second set of vectors including the second vector; and
   where the one or more instructions, that cause the one or more processors to compare the first vector and the second vector, cause the one or more processors to:
      compare the first vector and the second vector using a second technique that is different than the first technique based on identifying the second set of vectors.

* * * * *